No. 780,530. PATENTED JAN. 24, 1905.
E. J. RUBOTTOM & G. H. CLEMENT.
JACK FOR LIFTING VEHICLES.
APPLICATION FILED APR. 29, 1904.
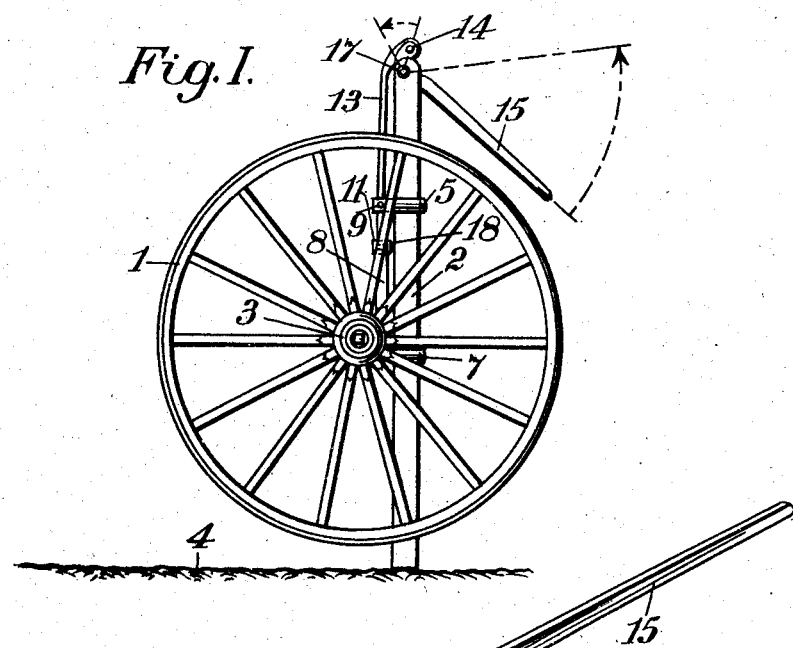
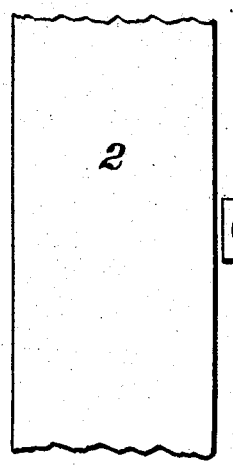
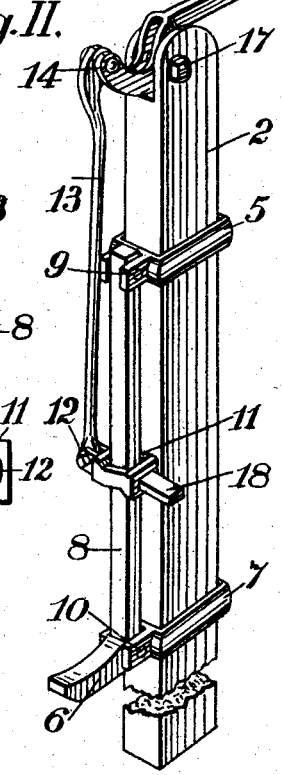
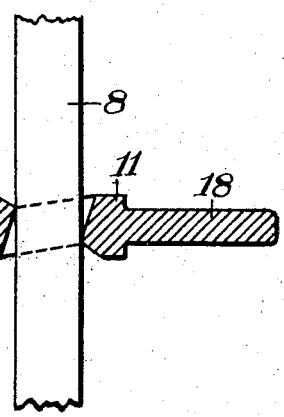
Witnesses:
E. A. Brandau
Elmer Wickes
Inventors:
Emphrey J. Rubottom,
George H. Clement,
By J. Richards & Co.

No. 780,530. Patented January 24, 1905.

UNITED STATES PATENT OFFICE.

EMPHREY J. RUBOTTOM AND GEORGE H. CLEMENT, OF FELTON, CALIFORNIA.

JACK FOR LIFTING VEHICLES.

SPECIFICATION forming part of Letters Patent No. 780,530, dated January 24, 1905.

Application filed April 29, 1904. Serial No. 205,631.

*To all whom it may concern:*

Be it known that we, EMPHREY J. RUBOTTOM and GEORGE H. CLEMENT, citizens of the United States, residing at Felton, county of Santa Cruz, and State of California, have invented certain new and useful Improvements in Jacks for Lifting Vehicles; and we hereby declare the following to be a full, clear, and exact description of the same, reference being had to the accompanying drawings, forming a part of this specification.

This invention relates to lifting-jacks for raising vehicles and to certain improvements therein whereby they are more conveniently operated.

Our improvements consist in mounting the lifting mechanism on a long stem-standard above instead of below the axles of the vehicles to be raised, so the device can be operated above the wheels without going behind the same, consequently to add to the convenience of use and to avoid soiling attendant's clothing, which commonly occurs when the lever and lifting mechanism is placed below the axle and behind the wheels of a vehicle, also consists in certain devices to facilitate this position and manner of operating.

The object of our invention is to provide a lifting-jack of a very simple form, inexpensive, and with the operative advantages above named. To this end we construct such lifting-jacks as illustrated in the drawings.

Figure I is a side elevation of one of our improved devices placed behind a wagon or carriage wheel in position for lifting the same. Fig. II is a view in perspective of the same device; Fig. III, an enlarged detail of Fig. II looking from the rear. Fig. IIII is an enlarged section through the clamping device that engages and holds the lifting-bar.

The inconvenience of setting lifting-jacks for the wheels of a vehicle are well known. The space at the front is occupied by a tongue or thills and doubletrees, so a lifting-jack has to be set behind the axle and also behind the fore wheels in an inconvenient manner. The same applies to the hind wheels when the wagon or carriage body projects rearward, the wheels offering an awkward obstruction in both cases. These objections we overcome by the construction shown in the drawings, now to be described.

1 is a vehicle-wheel with the lifting-jack in position behind the same, the latter consisting of a stem or standard 2 that is approximately two-and-a-half times the length from the axles 3 to the ground 4. This standard 2 can be made of metal or wood, preferably the latter for light vehicles. On this standard 2 is placed the sliding guides 5 and 7, to which a lifting-bar 8 is rigidly attached at 9 and 10, so the whole can be moved freely on the standard 2.

On the lifting-bar 8 is placed a movable clutch member 11, (shown enlarged in Fig. IIII,) that moves freely in one direction, but nips and holds the bar 8 when moved in the opposite direction. To this clutch member 11 is attached at 12 a lifting-rod 13, that extends up to and is pivotally held at 14 in the end of a lever 15, the latter mounted on a pivot 17 in the upper end of the standard 2 to form a toggle-joint, as shown in Fig. II.

The lifting-bar 8 has at the bottom a right-angular extension 6, that passes beneath the axle 3 to raise this and the wheel 1, as shown in Fig. I.

The guides 5 and 7 and the bar 8 are free to slide upward, the bar 8 moving freely through the clutch member 12, and if this bar 8 and the guides are to be lowered the operator pulls upon the handle 18, loosening the clutch 12, so the bar 8 will descend by gravity and then can be raised to come in contact with the axle 3 in a proper position for lifting the same. When the vehicle is to be lowered, this can be done by raising the lever 15, or the handle 18 can be raised to release the bar 8.

In operating the jack is handled from the top and set behind the wheel 1, as shown in Fig. I. The guides 5 and 7 and the bar 8 are then raised until the extension 6 comes under the axle 3, the clutch devices 11 holding the bar in the position required. The wheel and axle are then raised by pressing downward the lever 15, as shown in Fig. I, the pivots 14 and 17 crossing and forming a toggle-joint, as indicated, so the parts are held in position by the load. In this manner it will be seen the jack can be conveniently operated by a person standing outside the wheel without stooping and without being soiled by contact with the wheel 1.

Having thus explained the nature and objects of our invention and the manner of constructing and operating the same, what we claim as new, and desire to secure by Letters Patent, is—

1. In a vehicle-lifting jack, a main standard extending above the vehicle-wheel, with lifting devices thereon disposed above the axle to be raised, consisting of a lifting-bar arranged to slide on the main standard, and a rod and lever to raise the said bar, connected thereto by a releasing-clutch that slides upon and engages the lifting-bar when strained upwardly, substantially as specified.

2. In a vehicle-lifting jack, a main supporting-standard reaching from the vehicle-axle to the ground or floor and above the top of the wheel to be raised, with lifting devices attached to said standard extending above the vehicle-axle, consisting of a lifting-bar arranged to slide on the main standard, a lifting extension on said bar adapted to engage the axle of a vehicle, a lever and connecting-rod to raise said lifting-bar, and a releasable clutch that is engaged by upward strain on the connecting-rod attached thereto, substantially as specified.

In testimony whereof we have signed our names to this specification in the presence of two subscribing witnesses.

EMPHREY J. RUBOTTOM.
GEORGE H. CLEMENT.

Witnesses:
W. H. HORN,
J. W. HAYES.